US010182316B1

United States Patent
Tu et al.

(10) Patent No.: US 10,182,316 B1
(45) Date of Patent: *Jan. 15, 2019

(54) DETERMINING LOCATION OF PARKED VEHICLE

(71) Applicant: Apple Inc., Cupertino, CA (US)

(72) Inventors: Xiaoyuan Tu, Sunnyvale, CA (US); Anil K. Kandangath, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/650,711

(22) Filed: Jul. 14, 2017

Related U.S. Application Data

(63) Continuation of application No. 15/043,243, filed on Feb. 12, 2016, now Pat. No. 9,712,977, which is a
(Continued)

(51) Int. Cl.
*H04W 4/029* (2018.01)
*H04W 4/04* (2009.01)
*H04W 24/00* (2009.01)

(52) U.S. Cl.
CPC .......... *H04W 4/029* (2018.02); *H04W 4/046* (2013.01); *H04W 24/00* (2013.01)

(58) Field of Classification Search
CPC ..... H04W 4/029; H04W 4/028; H04W 4/046; H04W 24/00
(Continued)

(56) References Cited

U.S. PATENT DOCUMENTS 5,416,712 A 5/1995 Geier et al.
6,405,125 B1 6/2002 Ayed
(Continued)

FOREIGN PATENT DOCUMENTS

EP 2474943 7/2012
EP 1332336 10/2012
(Continued)

OTHER PUBLICATIONS

U.S. Appl. No. 14/065,224, "Non-Final Office Action", dated Mar. 2, 2015, 16 pages.
(Continued)

*Primary Examiner* — Mong-Thuy T Tran
(74) *Attorney, Agent, or Firm* — Kilpatrick Townsend & Stockton LLP

(57) ABSTRACT

Methods and devices for detecting a change in a motion state of a user of a mobile device are provided. The method includes determining, based on one or more sensors of the mobile device, that the motion state of the user is a driving state, the driving state indicating that the user is inside a vehicle that is moving, monitoring, with the mobile device, the one or more sensors, determining that a new motion state is a non-driving state. The method further includes identifying a location where the user exited the vehicle using one or more of the measurements from the one or more sensors before the determining that the new motion state is the non-driving state, and identifying the location where the user exited the vehicle as corresponding to a parked location of the vehicle.

17 Claims, 9 Drawing Sheets

Related U.S. Application Data continuation of application No. 14/065,224, filed on Oct. 28, 2013, now Pat. No. 9,264,862.

(60) Provisional application No. 61/866,490, filed on Aug. 15, 2013.

(58) Field of Classification Search
USPC .................................. 455/456.1–456.6, 457
See application file for complete search history.

(56) References Cited

U.S. PATENT DOCUMENTS

| | | | |
|---|---|---|---|
| 6,407,698 B1 | 6/2002 | Ayed | |
| 6,429,791 B2 | 8/2002 | Quinn | |
| 6,909,964 B2 | 6/2005 | Armstrong et al. | |
| 6,982,669 B2 | 1/2006 | Coatantiec et al. | |
| 7,369,061 B1 | 5/2008 | Sellers et al. | |
| 7,688,226 B2 | 3/2010 | McCall | |
| 7,734,315 B2 | 6/2010 | Rathus et al. | |
| 7,847,709 B2 | 12/2010 | McCall et al. | |
| 8,112,251 B2 | 2/2012 | Case, Jr. et al. | |
| 8,676,231 B2 | 3/2014 | MacDonald et al. | |
| 8,954,094 B1* | 2/2015 | Mishra | H04W 4/02 455/456.3 |
| 9,019,129 B2 | 4/2015 | Skinder et al. | |
| 9,080,878 B2 | 7/2015 | Skinder et al. | |
| 9,104,537 B1 | 8/2015 | Penilla et al. | |
| 9,264,862 B2* | 2/2016 | Tu | H04W 4/046 |
| 9,712,977 B2* | 7/2017 | Tu | H04W 4/046 |
| 2006/0111835 A1 | 5/2006 | Baker et al. | |
| 2006/0208568 A1 | 9/2006 | Kaita et al. | |
| 2006/0267799 A1 | 11/2006 | Mendelson | |
| 2007/0126603 A1 | 6/2007 | Driscoll et al. | |
| 2009/0091477 A1 | 4/2009 | McCall et al. | |
| 2009/0222776 A1* | 9/2009 | Meers | G05B 9/02 716/106 |
| 2009/0309759 A1 | 12/2009 | Williams | |
| 2009/0315767 A1 | 12/2009 | Scalisi et al. | |
| 2010/0318293 A1 | 12/2010 | Brush et al. | |
| 2011/0032105 A1 | 2/2011 | Hoffman et al. | |
| 2011/0093583 A1 | 4/2011 | Piemonte et al. | |
| 2011/0105097 A1 | 5/2011 | Tadayon et al. | |
| 2011/0172909 A1* | 7/2011 | Kahn | G01C 21/165 701/533 |
| 2011/0239026 A1 | 9/2011 | Kulik | |
| 2011/0294465 A1 | 12/2011 | Inselberg | |
| 2011/0307171 A1 | 12/2011 | Waite | |
| 2012/0115453 A1* | 5/2012 | Zheng | H04M 1/72569 455/418 |
| 2012/0197588 A1 | 8/2012 | Lee et al. | |
| 2012/0299754 A1 | 11/2012 | Korn et al. | |
| 2012/0310587 A1 | 12/2012 | Tu et al. | |
| 2013/0096817 A1 | 4/2013 | Fauci | |
| 2013/0099892 A1 | 4/2013 | Tucker et al. | |
| 2013/0103200 A1 | 4/2013 | Tucker et al. | |
| 2013/0184002 A1 | 7/2013 | Moshfeghi et al. | |
| 2013/0210406 A1 | 8/2013 | Vidal et al. | |
| 2013/0281079 A1 | 10/2013 | Vidal et al. | |
| 2013/0290045 A1 | 10/2013 | Levy et al. | |
| 2013/0297198 A1 | 11/2013 | Vande Velde et al. | |
| 2014/0028477 A1 | 1/2014 | Michalske | |
| 2014/0066091 A1 | 3/2014 | Varoglu et al. | |
| 2014/0136103 A1 | 5/2014 | Korn et al. | |
| 2014/0149060 A1* | 5/2014 | Meduna | G06F 1/3206 702/94 |
| 2014/0232569 A1 | 8/2014 | Skinder et al. | |
| 2014/0232570 A1 | 8/2014 | Skinder et al. | |
| 2014/0277843 A1* | 9/2014 | Langlois | H04M 1/6091 701/2 |
| 2014/0280580 A1 | 9/2014 | Langlois et al. | |
| 2014/0309806 A1* | 10/2014 | Ricci | B60Q 1/00 701/1 |
| 2015/0042451 A1* | 2/2015 | Matsumoto | G01C 21/165 340/5.61 |
| 2015/0050923 A1 | 2/2015 | Tu et al. | |
| 2015/0081218 A1 | 3/2015 | Pang et al. | |
| 2015/0154868 A1 | 6/2015 | Neuner et al. | |
| 2015/0163210 A1 | 6/2015 | Meyers et al. | |
| 2016/0163197 A1 | 6/2016 | Levy et al. | |
| 2016/0242008 A1 | 8/2016 | Tu et al. | |

FOREIGN PATENT DOCUMENTS

| | | |
|---|---|---|
| WO | 2014130194 | 8/2014 |
| WO | 2014130195 | 8/2014 |

OTHER PUBLICATIONS

U.S. Appl. No. 14/065,224, "Notice of Allowance", dated Oct. 1, 2015.

U.S. Appl. No. 15/043,243, "First Action Interview Pilot Program Pre-Interview Communication", dated Jan. 5, 2017, 4 pages.

U.S. Appl. No. 15/043,243, "Notice of Allowance", dated Mar. 24, 2017, 16 pages.

Kwapisz et al., "Activity recognition using cell phone accelerometers", ACM SIGKDD Explorations. 12(2), Jul. 25, 2010, 9 pages.

* cited by examiner

US 10,182,316 B1

DETERMINING LOCATION OF PARKED VEHICLE

CROSS-REFERENCES TO RELATED APPLICATIONS

This application is related to commonly owned U.S. patent application Ser. No. 13/773,481 entitled "AUTOMATIC IDENTIFICATION OF VEHICLE LOCATION", filed Feb. 21, 2013 (U.S. Pat. No. 9,080,878 issued Jul. 14, 2015), and owned U.S. patent application Ser. No. 13/773,546 (U.S. Pat. No. 9,019,129 issued Apr. 28, 2015) entitled "VEHICLE LOCATION IN WEAK LOCATION SIGNAL SCENARIOS", filed Feb. 21, 2013. This application is a continuation of U.S. patent application Ser. No. 15/043,243, entitled "DETERMINING EXIT FROM A VEHICLE", filed Feb. 12, 2016, which is a continuation of U.S. patent application Ser. No. 14/065,224, entitled "DETERMINING EXIT FROM A VEHICLE", filed Oct. 28, 2013, now U.S. Pat. No. 9,264,862, and also claims the benefit under 35 USC § 119(e) of U.S. Provisional Application No. 61/866,490, entitled "DETERMINING EXIT FROM A VEHICLE", filed on Aug. 15, 2013. Each of the above listed applications are hereby incorporated by reference in its entirety.

BACKGROUND

Mobile devices today can provide various functionality in response to a user request. For example, a user can request to see a navigation map or provide other user input to switch among user interfaces, or otherwise obtained desired functionality. However, users must provide input to get the desired functionality.

It is therefore desirable to provide methods and mobile devices that can automatically perform functions, without a user providing input. As identified by the inventors, one instance that automated functionality may be desired is an exit of the user from a vehicle. Therefore, it is desirable to also provide methods and devices they can determine an exit of the user from the vehicle.

BRIEF SUMMARY

Embodiments of the present invention can provide methods and mobile devices for determining an exit from a vehicle. Sensors of a mobile device can be used to determine when the user is in a vehicle that is driving. The same or different sensors can be used to identify a disturbance (e.g., loss of communication connection from mobile device to a car computer). After the disturbance, an exit confidence score can be determined at various times, and compared to a threshold. A determination of the exit of the user can be determined based on the comparison of the exit confidence score to the threshold.

Other embodiments are directed to systems, portable consumer devices, and computer readable media associated with methods described herein.

A better understanding of the nature and advantages of embodiments of the present invention may be gained with reference to the following detailed description and the accompanying drawings.

DETAILED DESCRIPTION

Embodiments can be used to determine when a user has reliably exited a vehicle. A vehicle exit can refer to the condition where a user has been driving for a while, and then exits the vehicle for a different transportation mode, such as walking (even if just for a split second before coming to rest a different location outside the vehicle). The determination of the exit can be used for various functions. For example, a determination of an exit can be used to determine a parking location or determine whether navigation instruction mode needs to be switched, e.g., from a driving mode to a walking mode. A determination of an exit can be used to change a user interface, performing communication tasks, or various other functions.

Embodiments can detect a disturbance (which may correspond to a determination of when a user has 'possibly' started exiting a vehicle) and continue to monitor a device state until exit is determined with confidence. At this point, a signal indicating an exit can trigger a function of the mobile device.

I. Use of Exit from Car

A user of the mobile device may perform certain tasks after exiting from a vehicle, e.g., after driving to a destination. For example, a user may often refer to a user interface designed a user is watching, as opposed driving. Embodiments can allow a user to define specific functions to be performed when the user has exited from the vehicle.

Figure 1:
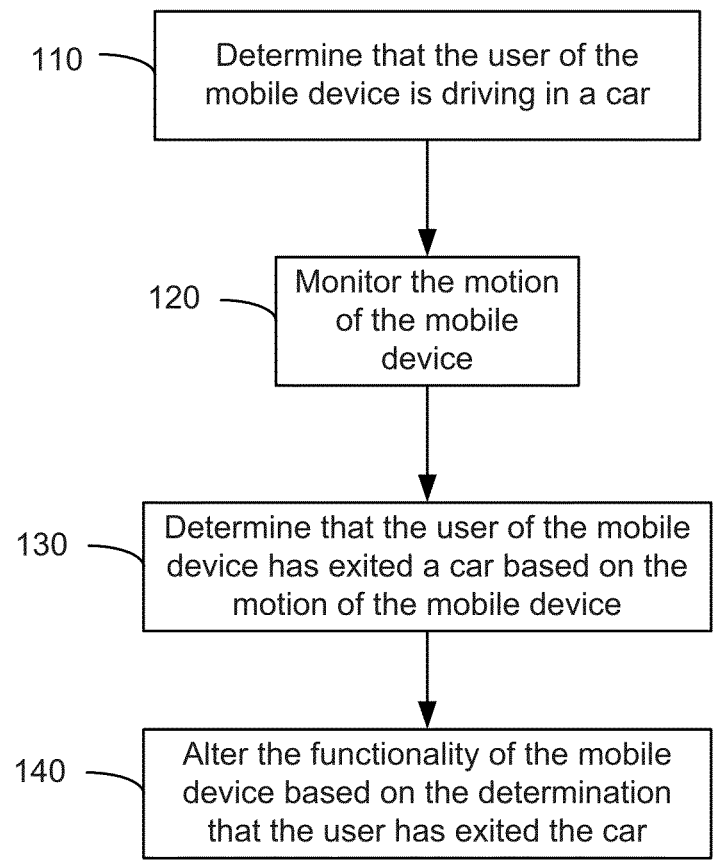
FIG. 1 is a flowchart of a method 100 for automatically providing user-desired functionality according to embodiments of the present invention.

FIG. 1 is a flowchart of a method 100 for automatically providing user-desired functionality according to embodiments of the present invention. Method 100 (as well as other methods described herein) may be performed entirely or partially by a computer system, e.g., by mobile device of the user and/or a server in communication with the mobile device.

At block 110, it is determined that the user of the mobile device is driving in a car. The determination of the driving state may be performed in various ways, and may utilize one or more sensors (e.g., an accelerometer or global positioning system GPS) of the mobile device. The user may be a passenger or a driver in the car. Various driving students can be identified, which may be based on a position or orientation of the mobile device, and may be based on a speed of the car. A particular driving state may have an associated probability of how accurate the determination of that driving state is.

At block 120, the motion of the mobile device is monitored. The motion of the mobile device can be monitored using sensors of the mobile device. In various embodiments, the motion can be a change from one static position to another, or a rate of motion (e.g., speed). For example, the mobile device can determine whether a tilt angle that the device's position has changed. As another example, the mobile device can determine whether the mobile device has suddenly been moved from a resting position. The mobile device can continuously determine a classification of the motion activity (e.g., into classifications of driving, semi-stationary, walking, and running, with various sub classifications). A motion classification is an example of a device state. A device can have multiple device dates.

At block 130, it is determined that the user of the mobile device has exited a car based on the motion of the mobile device. The exit determination may be done via various inputs such as: motion activity and non-motion activity (e.g., such as connectivity to a car computer). For example, a loss of a Bluetooth connection to occur computer can be used as a criteria in conjunction with motion activity.

At block 140, the functionality of the mobile device is altered based on the determination that the user has exited the car. Various functions can be performed in response to the determination that the user has exited the car, and such functions can be user-defined. In one embodiment, a determination that a user has exited the car can be followed by an identification of where the car is likely parked. The park location can be saved for later retrieval by the user.

In another embodiment, a different user interface (UI) can automatically be provided to the user, e.g., when a user selects a particular app. The different user interface a visual and/or audible. For example, navigation instructions can be switched from driving to walking when the user walks away from their vehicle. Thus, a user interface can be changed from a driving navigation UI to a pedestrian navigation UI.

The different UI can be composed of different settings. For example, if a user is driving, the interface may be set to use voice. Once the user has exited the vehicle, the interface may be set to provide visual information. Different sized fonts, icons, or other objects in the screen can be different sizes, e.g., be smaller and provide more information than the user has exited the vehicle, and is able to view the screen more intently.

Another example include sending identification to another mobile device when the user has exited. Such notification could indicate that the user has arrived at a particular destination, e.g., when the user is meeting a friend. Another example includes sending a signal to other electronic devices. For instance, if the location corresponds to the user's home, a determination of the exit because the signal to be sent to electronics at the user's home (e.g., lighting, heating, cooling, or other functionality)

II. Determining Exit from Car

A. Method

Figure 2:
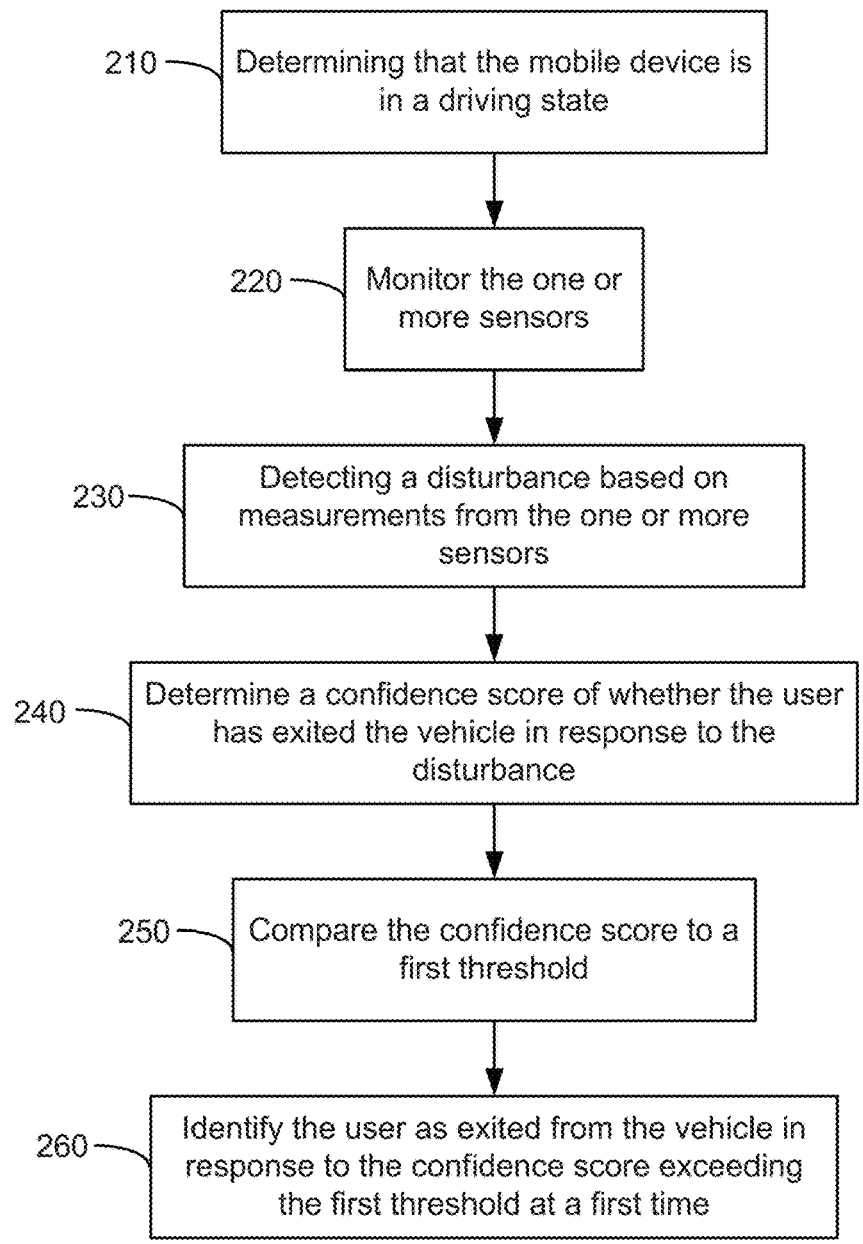
FIG. 2 is a flowchart illustrating a method 200 for detecting an exit of a user of a mobile device from a vehicle according to embodiments of the present invention.

FIG. 2 is a flowchart illustrating a method 200 for detecting an exit of a user of a mobile device from a vehicle according to embodiments of the present invention. One or more specified actions can be performed by the mobile device in response to the detection of the exit of the user from the vehicle.

At block 210, it is determined that the mobile device is in a driving state. The driving state can indicate the vehicle is moving and that the user is inside the vehicle. The driving state can be determined by motion classifier application is running on the mobile device. The determination of the driving state and other motion classifications can be based on one or more sensors of the mobile device.

As an example of the determination of the driving state, the device may move with the vehicle in unison most of the time. The mobile device may be an indication with the vehicle in order to obtain position information from the vehicle. As another example, the tilt angle of the mobile device they be stable (i.e., not change a significant amount compared to a baseline value) over a certain period of time. The tilt status may be combined with the measurement that the device is moving. When the user is driving, mobile device may be mounted onto the dashboard of the vehicle, or may simply be resting (e.g., in a cup holder), which can also be considered to be mounted state.

A level of confidence of the driving state can be monitored. A certain level of confidence may be required before certain steps of method 200 are performed. Several subtypes of driving may be allowed (e.g., driving with mobile device in hand or mounted), each of which may have a different level of confidence.

At block 220, the one or more sensors of the mobile device are monitored. The data from the sensors can indicate indicia that an exit by the user may occur in the near future or have possibly occurred. Data from the sensors can be obtained the periodic fashion, e.g., every 2 to 5 seconds. In various embodiments, the monitoring of some or all the sensors is only begun after a driving state is identified.

At block 230, a disturbance is detected based on measurements from the one or more sensors. The disturbance indicates a possibility that the user exited the vehicle. A disturbance signal may be generated in response to measurements from different sensors, and the disturbance signal may be generated by different circuitry and/or software modules. For example, a disturbance may be detected when a wireless connection to a car computer is lost, a tilt angle of the mobile device changes, or a change in motion is detected. Disturbance signal can be generated in response to any particular sensor measurement, or a particular combination of such measurements.

The disturbance may be viewed as a hint that the user may be exited the vehicle. However, the disturbance is not a clear indication that the user has a real exit the vehicle. For example, a wireless connection (e.g., Bluetooth) can be inadvertently lost when the car stopped a stop sign, and thus loss of connectivity may be a spurious event. But, the disturbance can be used as a trigger for additional analysis, which can confirm an exit with a higher degree of accuracy.

At block 240, a confidence score of whether the user has exited the vehicle can be determined in response to the disturbance. The determination may be made by the mobile device at a plurality of times after the disturbance. For example, a confidence score can be determined periodically after the disturbance is detected.

The confidence score can be determined based on measurements from the one or more sensors at the plurality of times. In one embodiment, each confidence score can be determined based solely on the measurements at the respective time. In another embodiment, a confidence score is dependent on the measurements for the current time and a previous times. For example, the current measurement can specify change in the confidence score from value determined at the last measurement time.

In some embodiments, a confidence score can be increased or decreased with the progression of time based on measurements of the one or more sensors. Certain measurements can also cause the determination of the confidence course to be stopped. For example, if GPS measurements indicate that mobile device's family and 30 mph, the mobile device can be determined to be in a driving state with high confidence. Such a situation, the determination a confidence score can stopped.

At block 250, the confidence score is compared to a first threshold. The first threshold may be the initial threshold that indicates a higher likelihood that the user has a real exit the vehicle. Such a first threshold may be characterized as indicating a "mate exit" condition. Exceeding the first threshold can also cause an initial function to be performed, e.g., obtaining a location of the first threshold is exceeded.

In another embodiment, the first threshold is a final threshold that is used to indicate that the user has indeed exited the vehicle. Such threshold may be set as the pulse by the manufacturer or by the maker of a software application. In some implementations, the user can specify any number of thresholds. In one implementation, a user can specify increases or decreases in the sensitivity and accuracy of the determination of the exit.

At block 260, the user is identified as exited from the vehicle in response to the confidence score exceeding the first threshold at a first time. Once the user is identified as exited from the vehicle, one or more functions may be performed, as is described herein. For example, the user interface for navigation application can be changed to a walking configuration.

B. Modules

Figure 3:
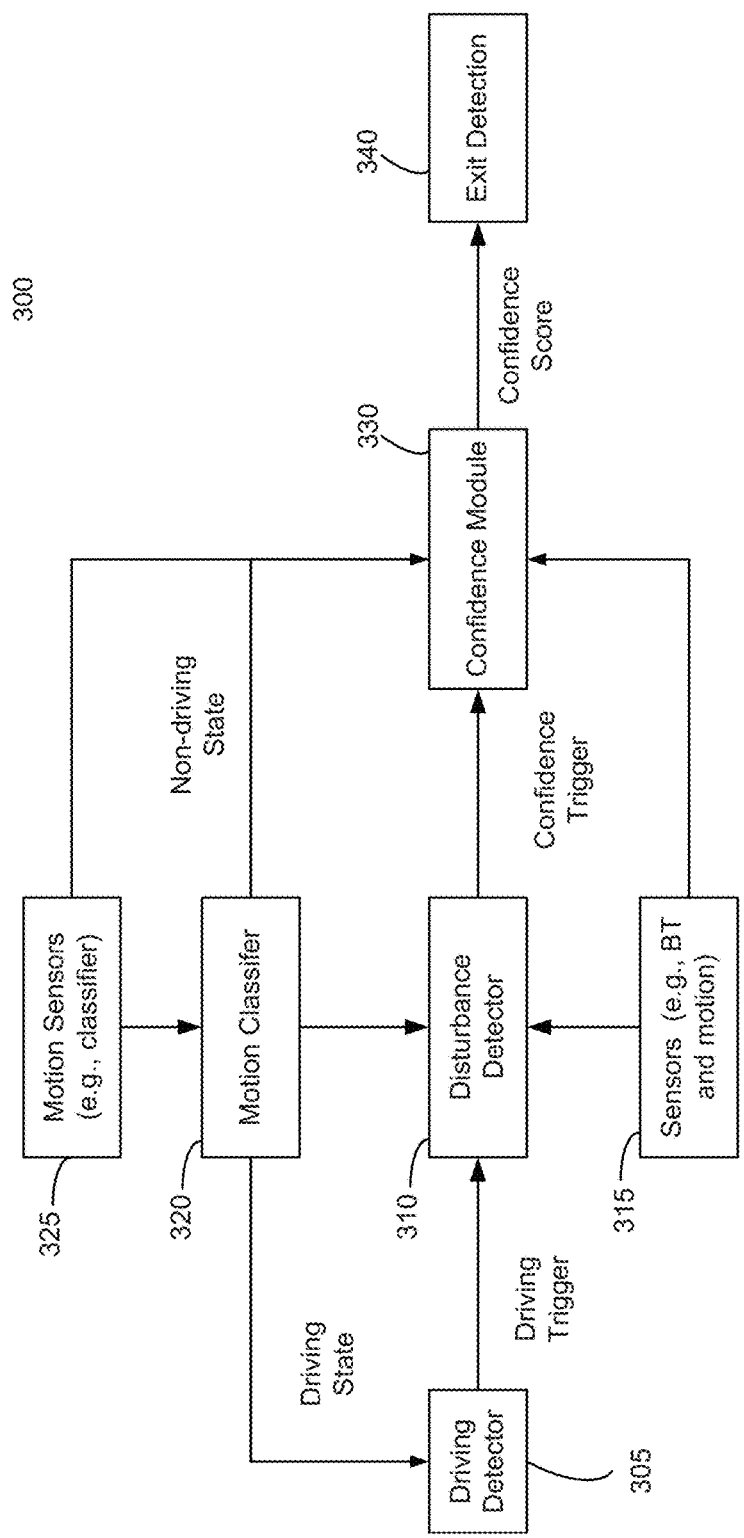
FIG. 3 shows a block diagram 300 illustrating an exit detection application that can execute on a device according to embodiments of the present invention.

FIG. 3 shows a block diagram 300 illustrating an exit detection application that can execute on a device according to embodiments of the present invention. The modules depicted may be hardware or software modules for analyzing data and providing output information within the mobile device.

A driving detector 305 can be a software module, flag, signal, or other construct that can be used to initiate operation of a disturbance detector 310. Driving detector 305 can receive information from motion classifier 320, where the information indicates that the mobile device (and thus the user) is in a driving vehicle. Driving detector 305 can cause a driving trigger to be sent to disturbance detector 310.

Disturbance detector 310 can begin to monitor sensors 315 in order to detect a disturbance. Disturbance detector 310 can also receive information from motion classifier 320. Disturbance detector 310 can analyze such information in order to make a determination of the mobile device has undergone a specific disturbance that indicates a user may exit the vehicle.

In one embodiment, if a user is driving (i.e., a driving state is detected), disturbance detector can keep monitoring any kind of difference in the activity (motion) detection obtained from motion classifier 320. If the activity classification is switched from driving to some other activity, or the confidence for the driving state changed, or the type of driving changed, then disturbance might be detected depending on the specific criteria program for disturbance detector the time. For example, if the motion classification suddenly went from driving mounted to driving in hand, then that might be considered a disturbance, indicating an exit might be possible in the near future.

Motion classifier 320 can receive data from motion sensors 325 to determine a classification for the current motion state of the mobile device. In one embodiment, a different likelihood can be determined for each motion state, where these likelihoods can all be provided to disturbance detector 310 and driving detector 305. Thus, even if a particular motion state does not have the highest likelihood, and the likelihood is greater than some specified threshold, a trigger can result. Sensors 325 can be different or a subset of sensors 315. Motion classifier 320 can use machine learning to determine the likelihoods for each motion state, as is described in more detail below.

Disturbance detector 310 can periodically receive information from sensors 315 in motion classifier 320. For example, motion classifier 320 can provide the new classification for the motion state periodically, e.g., every 2 to 5 seconds. As another example, a sensor can indicate whether or not the wireless connection (e.g., Bluetooth) to occur computer has been lost.

As another example of a disturbance is a change of the mobile device from a mounted state to a non-mounted state. The mounted state can be defined as a stable tilt angle. The non-mounted state can be any change to the tilt angle, with the amount of change can be required to be the specified type or amount. In this case, if the user removes the mobile device physical mount on the dashboard of the car, it can be determined that the user may exit the vehicle soon, and thus trigger algorithm to detect whether an exit has occurred or will occur.

A disturbance signal may be generated internally by the disturbance detector or be signals from motion classifier 320 or sensors 315. Many factors (e.g., different values from the sensors) and criteria may be used to determine whether disturbance has actually occurred. In response to the disturbance signal, a confidence trigger may be generated to signal a confidence algorithm for determining a confidence of whether the user has exited the vehicle. Multiple disturbances can result from a same action, e.g., movement of a mobile device because the change in the motion state as well as a change in the mounted state.

Confidence module 330 can begin performing a confidence algorithm based on the trigger from the disturbance detector 310. Conference module 330 can perform a confidence algorithm based on motion state information from classifier 320 and from data from sensors 315. Confidence module 330 can provide a confidence score. Further details of the confidence algorithm are provided below.

Disturbance detector 310 and conference module 330 can monitor for changes that might indicate that the mobile device is still in a driving state. For example, was classifier 320 can provide data to disturbance detector 310 and conference module 330 indicating that the mobile devices in a driving state, which can cause conference module 330 to stop processing a confidence algorithm and cause disturbance detector 310 to begin detecting a new disturbance. Such a scenario might result of initial disturbance was false.

Exit detection 340 receives the confidence score from confidence module 330 and compares the confidence score to one or more thresholds. In turn, exit detection 340 can generate trigger signal that causes one or more functions to be performed. Such functions can include changing setting on the mobile device, obtaining new data (e.g., a GPS location), and changing a user interface for an application.

III. Detecting Disturbance

As described above, sensors can be monitored for disturbance when the mobile device is determined to be in a driving state. The driving state may be determined once a confidence for the driving state is above a threshold. The sensors can be polled periodically at time intervals (also referred to as epochs). In response to the detection of a disturbance, an exit confidence algorithm can be initiated to determine whether the confidence is high enough to call an exit at subsequent times (which may be at the same time rentable as monitoring the sensors to detect the disturbance).

Various data signals from the sensors can be independently or in combination to determine that a disturbance has occurred. Data signals from one or more sensors (e.g., from an accelerometer) can be used to determine a measured value (e.g., measurement of the tilt angle). The measured value can provide a determine state of the mobile device (e.g., mobile device has been dismounted) and/or a likelihood for one or more device states. Various measured values and/or device states can be used to conclude that a disturbance has indeed occurred.

Examples of a change in device state include going from a mounted state to a dismounted state; a decrease in a confidence of a driving classification (or change may be required to be a specified amount were confidence can drop below a threshold); a change in a motion classification from driving to non-driving; an abnormal acceleration variance; and loss of a wired or wireless connection (e.g., Bluetooth) to a vehicle computer. The vehicle computer can be any circuit that is identified as being associated with the vehicle. In some embodiments, the vehicle computer can itself be removable from the car. Another example for determining a disturbance can use a pressure sensor, where there is one pressure in the car while driving, and as soon as the door is open, there is a pressure change that can be identified with the user potentially exiting the car.

The various changes and existing device states can be used in combination, and one device state or change can negate another one such that a disturbance is not detected when a particular device state exists, even though another change in device state would typically indicate a disturbance. For example, a loss in a wireless connection might normally cause a disturbance; but if the mobile device is in a mounted state and has a driving classification, then disturbance might not be identified.

A. Disconnection from Vehicle Computer

As described above, the mobile device can be chemically coupled to a vehicle computer. As an example, such a vehicle computer can allow media (e.g., a video or music) from the mobile device to be played on a video screen and/or speakers of the vehicle. As another example, the vehicle computer can perform centralized functions for the vehicle, such as GPS, navigation, and other functions. Such a connection can be a wired connection (e.g., USB) or a wireless connection (e.g., Bluetooth).

The loss of a connection to the vehicle computer can be an indication that the user may be exiting the vehicle. For example, the user may unplug the mobile device from a dock or cable that is connected to the vehicle. However, the user may perform such an action even when driving. Thus, such an act may only be viewed as a disturbance, with the confidence algorithm using other data (which may still include the status of the connection in case it gets reconnected).

A wireless connection can be even less reliable about the user exiting the vehicle than a wired connection. For example, a wireless connection can be lost in the middle of driving due to interference. A difference in the reliability can be assessed by using different weights in determining the contribution of the loss in connection to the ultimate determination of whether a disturbance has occurred. The wireless connection (and the wired connection) can receive some identification signal from a vehicle computer that identifies that the computer is associated with a vehicle, as opposed to being some other device (e.g., just a Bluetooth earpiece).

B. Mounted State

Another device state that can be used for disturbance whether device is a mounted state. The mounted state is not necessarily that the device is physically mounted, but can relate whether a tilt angle of the device is stable (i.e., relatively constant with only minor changes, e.g., which may occur from vibrations). For example, if the mobile device is in a cup holder, the tilt angle can still be stable, and the mobile device may be identified as being in a mounted state. Thus, the mounted state can represent that the device is rigidly coupled to the vehicle. The stability of the tilt angle can measured as a function of time, and thus be an estimation over time about how stable the tilt angle is. If the tilt angle changes, the device status can be changed to non-mounted. If the tilt angle become stable again, then the device status can be changed back to mounted.

The change in the device state to non-mounted can be used as a disturbance that indicates the user may exit the vehicle. For example, if the device is left in the cup holder, the user is not moving it and not caring in outside the vehicle. The moment the user grabs a mobile device, a disturbance can be detected. In one embodiment, the tilt angle can be measured using an accelerometer in the mobile device. A change to a non-mounted state can occur even when the change is not abrupt that occurs slowly over time, although not too slowly. A certain minimum change in the tilt the angle can be required for a change to the non-mounted state.

C. Motion

A change in the motion classification can also be used as a factor in determining whether a disturbance has occurred. As examples, the change in motion may be a change in one driving state to a change in a driving state, a decrease in the confidence (likelihood) of the current driving state, or change to a non-driving state. Such changes may occur when measurements by an accelerometer change rapidly.

For example, the driving state made change from driving mounted state to a driving in-hand state, where the mobile device is in a user's hand. As another example, a change from a driving classification to a stopped classification may indicate a disturbance. A time criteria can be used in combination with the change in motion classification, e.g., where a disturbance is identified only when the non-driving state (e.g., stopped) exist for an initial threshold time. After this initial threshold time, the continuation of the non-driving state can be further used to increase the confidence score for the exit of the user from the vehicle.

D. End or Continuation of Disturbance

The same criteria that is used to identify a disturbance can be used to detect a disturbance has ended. The end of a disturbance can cause the exit confidence algorithm to be stopped. Thus, if the state of a disturbance changes, all measuring a confidence score of the exit, the mobile device can go back to looking for a disturbance and stop calculating the exit confidence score. The end of a disturbance can be identified, for example, the mounted state is detected again, connection to the vehicle computer is made, and/or driving classification is determined.

As an example, a user may be stopped and looking at a map application on the mobile device, but then resume driving after placing the mobile device back into physical mount on the dashboard. The change back to the mounted state can cause the determination of exit confidence score to be stopped. Also, even if the device is in a non-mounted state (e.g., where passenger is using mobile device and moving it around), other sensor values can override the non-mounted state so that a disturbance signal is not generated (e.g., a measurement that the mobile device is moving at 30 mph can clearly indicate that an exit by the user is not imminent).

Alternatively, the continuation of the measurements that were originally used to detect a disturbance can be used to increase the confidence that the user has or will exit the vehicle. For example, a continuing disconnection from the vehicle computer or continuing non-driving state can increase the exit confidence score.

IV. Motion

In FIG. 3, motion classifier 320 received data from motion sensors 325. The function of motion classifier 320 is not described in more detail.

A. Measurement of Motion

A motion classifier can receive motion data motion sensors at periodic intervals (also called epochs). The motion sensors can include any information about position (e.g., GPS or other location algorithms) or the change in the position (e.g., an accelerometer). An advantage of using an accelerometer is a relatively low usage of power. The output of a triaxial accelerometer sensor can be defined, for example, where "a" is the vector containing its components in three axes, $a_x$, $a_y$, and $a_z$.

In one embodiment, the motion classifier can store the data measured at each epoch. Instead or in addition, motion classifier can store a classification state corresponding to each epoch. The length of the buffer storing such information can be a specified number of epochs. For example, a buffer can store motion states every t seconds for N epochs.

The history of the data measurements from motion sensors can be used in the classification algorithm. Additionally, a history of motion classifications at previous epochs can be used by the exit confidence algorithm (e.g., where a continued walking state can cause exit confidence to increase at a greater rate over time).

B. Categorizing Motion

The motion classifier can output a specific type of motion that the user is identified as performing. For example, motion classifications can be walking, fast walking, running, driving, semi-stationary (e.g., when the user is not moving, but it is handling the mobile device such that it is moving). The motion classifier track the motion of the mobile device and correlate such motion to known behavior patterns that correlate to known motion activity by the user.

The algorithm for the motion classifier can be trained using various inputs at a particular time, with a motion classification at that time is known. In this manner, when those inputs appear again, the motion classifier can identify the corresponding motion classification. The training can be performed using machine learning. The motion classifier can be implemented using various models, such as neural networks. In one embodiment, the motion classifier can be trained by a manufacturer or software developer generically for any user. In another embodiment, the most classifier can be developed or refined by training on motion by the user of the mobile device, thereby allowing personalization. In such personalization, confirmation for known motion classifications can be provided from other sensors or by feedback from the user.

In some embodiments, the motion classifier can operate as follows. A presumed activity is an activity associated with a motion pattern of a mobile device as determined by modules onboard the mobile device. A particular activity may be inferred based on data collected during a specific time window by sensors on the mobile device, including accelerometer data. The particular inferred activity is "presumed" to be the current activity occurring during the time window if the motion pattern of the mobile device matches known motion patterns associated with the presumed activity. The presumed activity may be performed by a user of the mobile device, for example. The presumed activity may also be any activity associated with the mobile device that is currently occurring, whether performed by a user or not (e.g., a mobile device mounted on a moving object may be associated with a presumed activity of "driving," regardless of whether a user is actually driving a vehicle).

In general, data is collected during a training phase to generate likelihood models so that motion data received outside of the training phase can be compared to motion data collected for known activities during the training phase (represented in the likelihood models). The training data is passed through a training module, which associates certain derived values characterizing the motion of a mobile device with certain activities. Each derived value calculated from the training data is associated with the activity indicated in the activity label. A likelihood model generator in the training module calculates likelihood models that define the likelihood that certain features are present or have particular values when the mobile device is associated with a particular activity. In particular, certain combinations of derived values associated with an activity may be used to differentiate between the activity and other possible activities. The likelihood models generated by the likelihood model generator define a likelihood that an observed combination of derived values corresponds to a particular activity. The likelihood models can be used to determine a presumed activity based on accelerometer data collected by a mobile device after the training phase is complete.

A motion/static detector can determine whether the mobile device is static or in motion during this time period. For example, detecting whether the mobile device is in motion or is static can be determined, for example, using GPS data, cellular signals, and/or changes in accelerometer readings. If the mobile device is static, the activity type for the mobile device during the time window is designated as static. If the mobile device is in motion, the data representing the motion is passed to an activity detection module to identify a presumed activity based on the detected motion patterns. The classifier can assign a particular activity class, such as walking, running, or driving, for example, to data received within a time window. Further details can be found in U.S. patent application Ser. No. 13/153,361, entitled "Activity Detection," filed Jun. 3, 2011, which is incorporated by reference.

C. Example

Figure 4:
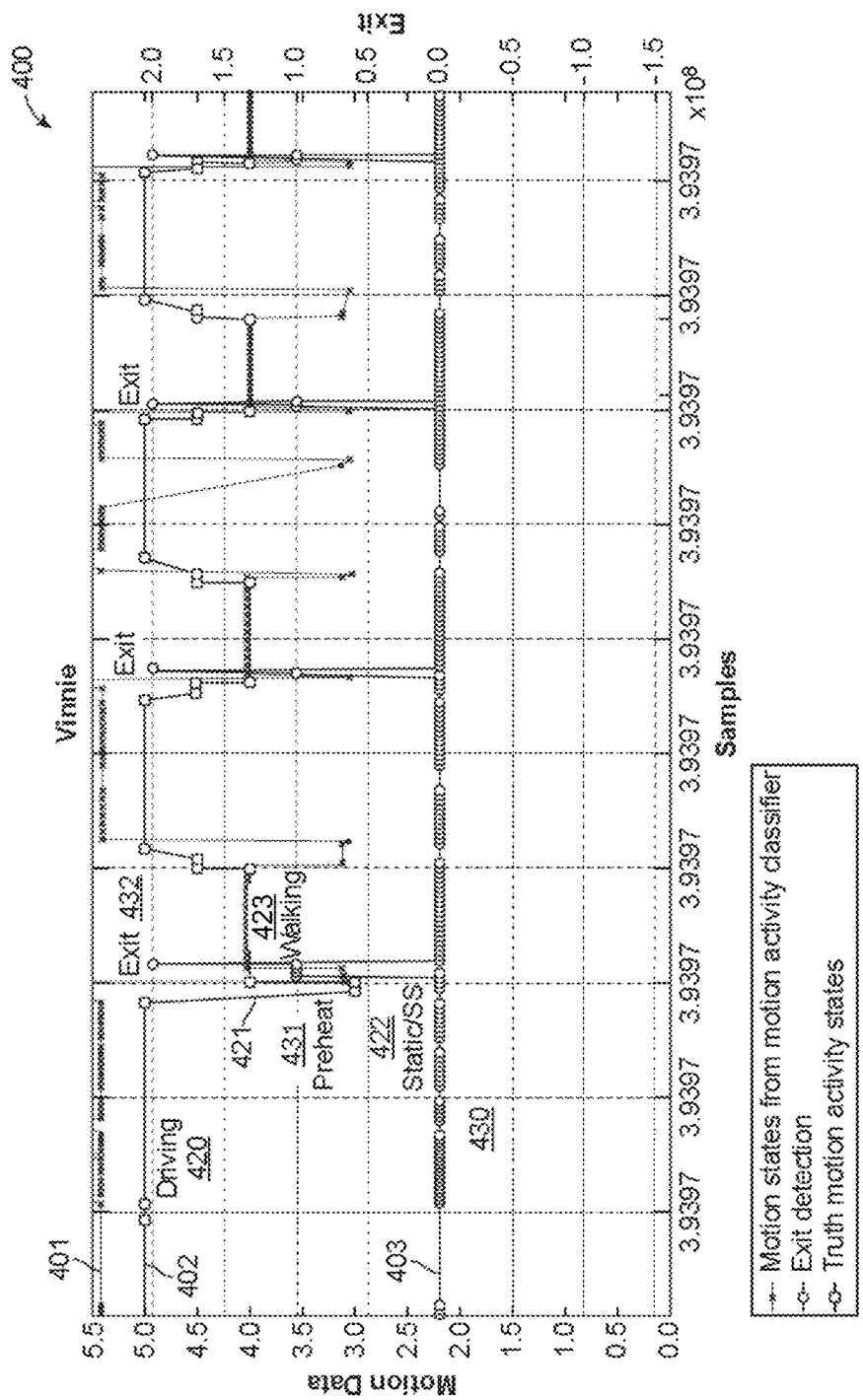
FIG. 4 shows a diagram 400 illustrating motion classifications over time according to embodiments of the present invention.

FIG. 4 shows a diagram 400 illustrating motion classifications over time according to embodiments of the present invention. Along with motion classifications, the determination of an exit is also illustrated. The left vertical axis shows motion data, where the numbers correspond to different motion states. The right vertical axis shows the exit state where '0' signifies no exit detection, '1' signifies a possible state, and '2' signifies a confident exit state. The horizontal axis corresponds to time. The determination of the motion classification can occur at regular intervals.

The values of plot 401 correspond to motion states from the motion classifier. The values of plot 402 correspond to truth motion activity states (the true motion state as determined by an observer). The values for the motion data are shown on the left vertical axis. The values of plot 403 correspond to states of an exit detection algorithm. The values for the exit confidence score are shown on the right vertical axis.

At region 420 plot 402, the mobile device is identified as being in a driving state. This driving state continues and traffic motion is seen in region 421. A static state 422 is an identified, followed by a 423. As one can see motion activity drops from driving state 420 at the highest value to a lowest value at static state 422. Walking state 423 is an intermediate motion value.

In plot 403, the exit confidence score is zero in region 430. In region 430, the exit confidence algorithm may not be running and simply have a default value of zero to indicate that the exit confidence algorithm is not running. At a time that is correlated to the change in the motion data and the determination of static state 422, a disturbance is detected. Disturbance is identified in diagram 400 as preheat 431. This preheat identification can cause the exit confidence algorithm to begin. As shown, the exit confidence stays flat for a short period of time after the disturbance. An exit event 432 is identified for the exit confidence reaches a threshold value.

Further motion classifications and exit events are shown at later times in diagram 400. The further examples show that identification of the static state is not required for the detection of an exit.

V. Exit Confidence Score and Exit Detection

As described above, an exit confidence score may be determined after a disturbance is detected. The confidence score may depend on the current motion classification. Different confidence scores and/or rate of increase of the confidence score can depend on a current motion classification and likelihoods of multiple motion classifications. For example, every possible activity can have an associated likelihood, which may impact the confidence score. The confidence score over time can also use values from other sensors and other modules, e.g., whether the mobile device is in a mounted state.

As shown in FIG. 4, the exit confidence score can be continually determined (e.g., at specified time intervals) after disturbance has been detected. They the confidence score can be determined at the same intervals as a motion classifier determines motion activity (e.g., driving, walking, running, etc).

A. Factors for Calculation of Confidence Score

Various factors (such as sensor data and device states) can be used in determining the exit confidence score. Various factors can be used in combination to determine the exit confidence score. The algorithms may be used based on certain device states. For example, if a driving state is determined with high likelihood, the exit of the can actually be stopped. As another example, if the device is not in a mounted state, the exit confidence algorithm (module) can increase at a higher rate than if the device was identified as being in a mounted state.

Additionally, the factors used to detect a disturbance can also be used to determine the exit confidence score. Alternatively, or some or none of the factors used to detect a disturbance are used to determine the exit confidence score.

The determination of exit confidence score can also use additional factors besides those used to detect a disturbance.

In some embodiments, the exit confidence module uses motion factors, which includes motion sensor data, current motion classifications and corresponding likelihoods, and changes of motion classifications. The motion factors can be coupled with measurements of time to determine the exit confidence score. For example, if the motion classification has been walking for certain period of time, the exit confidence score may be a higher value than if the walking classification had existed for a shorter period of time.

Non-motion factors can also be used. For example, the same sensor data is used for disturbance can be used for determining the exit confidence score. In various embodiments, these non-motion factors can be used to determine whether or not the exit confidence algorithm continues, and may be used to determine which algorithm to use. The non-motion factors can also simply contribute to a combined score based on all the factors. For example, if the mobile device is still connected to the vehicle computer while some other sensors detect walking, then the exit confidence algorithm can discount the detection of walking, and the exit confidence algorithm may be stopped. As another example, if a disconnect from the vehicle computer is identified, this may cause the confidence score to increase. But, there was a reconnect, that can cause a decrease in the exit confidence score. If the mobile device becomes reconnected or is never disconnected, a call of an exit may be prevented (i.e., a disconnected state can be required for an exit to be identified).

B. Incrementing/Decrementing

In some embodiments, the exit confidence score can be determined by incrementing a decrementing the score from a previous time (epoch). The change in the score can be determined based on current sensor values and motion classifications. Each of the sensor values in different motion classifications (with corresponding likelihoods) can provide a different increment or decrement contributions to the score. The contributions can be summed to provide the final change in the score. For example, an identification of walking state with high confidence can provide a contribution of an increase of 0.3. But, if the device is in a mounted state, this can correspond to a contribution of a decrease of 0.1.

Examples of activities and can cause an increase in the exit confidence score include walking, running, semi-stationary, or otherwise moving, but not in a driving state. Thus, if the exit confidence score as a default value (e.g., 1) after the disturbance detection, the default value can increase in such activities are determined at later times. For example, the motion classification for the mobile device is sedentary or slow walking, the exit confidence score can keep increasing over time while such a classification is present.

Some activities can cause the score to remain constant (e.g., provide a zero contribution for change in the score), at least for certain period of time. For example, if the motion classification is static or semi-stationary (e.g., standing line the moving the mobile device), this may not cause an increase in the score. However, if such activity is present for certain period of time, such continued activity can cause an increase in the confidence score.

In some embodiments, different types of activities can cause different rates of increase the confidence score. For example, walking or running may cause a faster increase the confidence score than a semi-stationary state.

Certain activities or sensor measurements can cause the confidence score decrease. For example, if the motion classifier identified a driving state, then the confidence score decrease as a driving state indicates a lower likelihood for the user has exited the vehicle. A determination of a driving state can also cause the confidence score algorithm to stop determining the confidence score, but in effect can provide a confidence score of zero. Such a scenario might happen when a user is stopped at a red light and grabs the device, thereby causing a disturbance, but then the user may begin driving again when a green light appears.

Other sensor measurements may be used to decrease the confidence score. For example, a reconnection to the vehicle computer can cause decrease in the exit confidence score. Other examples include an identification of a mounted state or potentially location measurements that indicate that mobile device is still located on the road has not moved appreciably.

Figure 5:
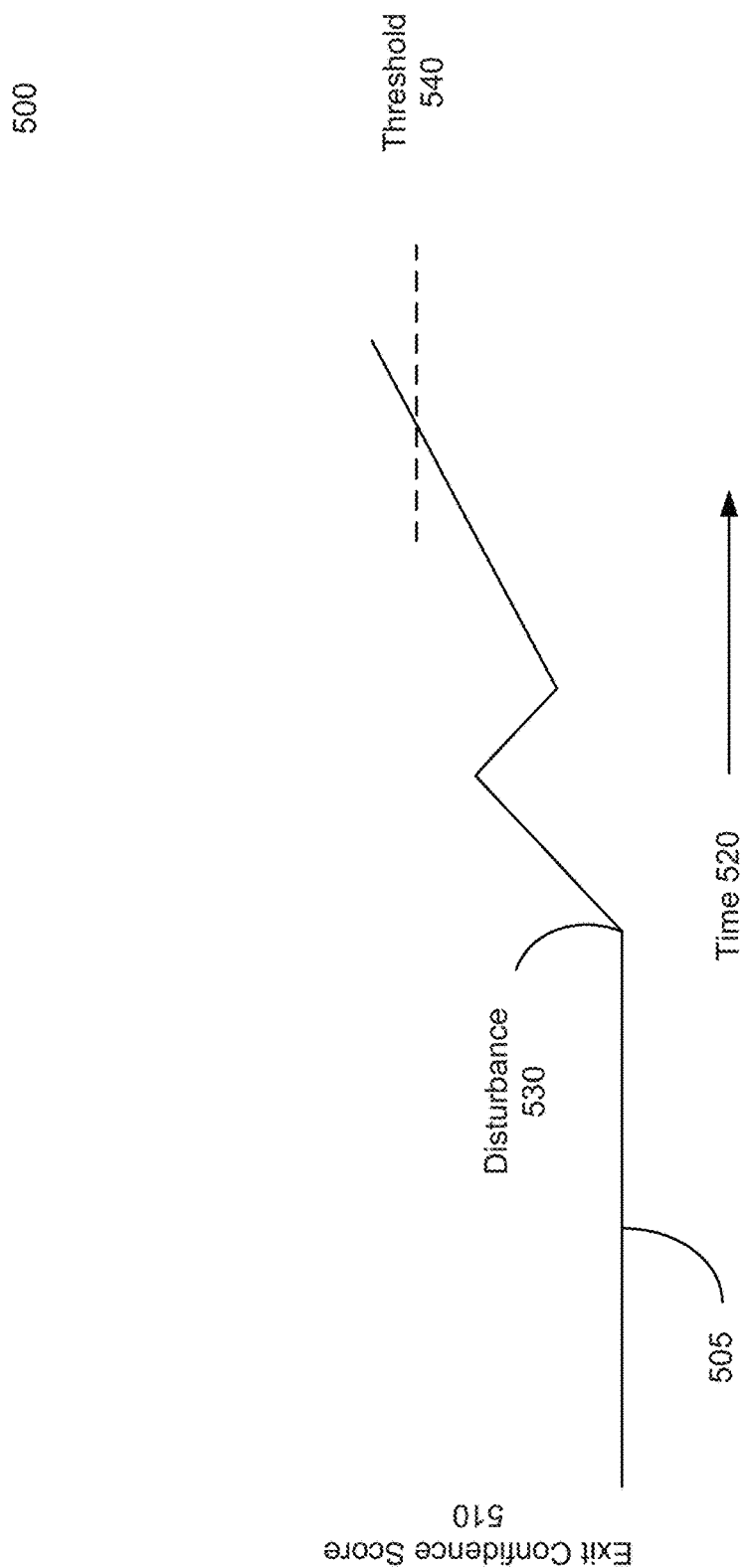
FIG. 5 is a plot 500 illustrating the change in exit confidence score over time according to embodiments of the present invention.

FIG. 5 is a diagram 500 illustrating the change in exit confidence score over time according to embodiments of the present invention. The horizontal axis corresponds to the time 520. The vertical axis corresponds to the exit confidence score 510. Plot 505 shows the change of the exit confidence score over time.

Plot 505 starts out at a zero value, which can correspond to when the user is driving. A disturbance 530 is detected. At this point, a confidence score algorithm can be initiated to begin determining the exit confidence score. The score can be determined at periodic intervals starting from when disturbance 530 occurs.

After disturbance 530, plot 505 increases. The increase may be the result of a determination of the walking state, which may be determined by a motion classifier. The increase can be due to many factors, such as the continuance of the condition(s) that cause disturbance 530 to be detected, and other factors described herein.

Plot 505 increases up to a point, then begins decrease 535. The decrease could result from many factors, such as a brief reconnection to the vehicle computer. In other examples, plot 505 can increase continuously. After decrease 535, plot 505 begin to increase again. The rate of increase at this point can differ than the rate of increase just after disturbance 530, or the rate could be the same. As mentioned above, the rate of increase of the exit confidence score can depend on many factors, e.g., different motion classifications can result in different rates of increase of exit confidence score. As another example, the rate of increase itself can increase when an additional disturbance is detected. For instance, a change to a non-mounted state can cause the initial disturbance, but then a disconnect from the vehicle computer can cause a greater rate of increase the exit confidence score.

As the exit confidence score increases, the exit confidence score can exceed thresholds 540. At this point, it may be determined that the user has exited the vehicle. In response to the exit, the mobile device can initiate one or more functions, as is described herein.

C. Thresholds

In various embodiments, the threshold value for determining an exit can always be set to be the same, may change for different situations, and may even change for a given disturbance based on sensor measurements and device states. For example, a threshold can be increased or decreased depending on whether devices in a mounted state, connected to a vehicle computer, or the current motion classification for the device. Such a change of the threshold Same effect of increasing and exit confidence score at different rates depending on sensor measurements and current device states.

An example of a decreasing a threshold can be when a walking state is identified with a high likelihood. As soon as a high likelihood of the walking state is detected, only 10 time steps of the walking state may be required, as opposed to or time steps or a lower likelihood or other motion classification is determined. A low likelihood of the walking state may require 15 time steps. As noted, threshold can be defined based on a number of time steps given a particular rate of increase per time step. A same effect can be achieved by having different rates of increase per time step for different levels of likelihood for a walking state.

In some implementations, there can be certain requirements before an exit is detected. For example, if a require that a walking state be determined for at least a short period of time before making the exit determination. This can have the same effect of increasing the threshold, although various implementations are possible.

More than one threshold can be used. For example, a lower threshold can be used to initial some initial functions, such as obtaining a location that may correspond to the parked location. However, this lower threshold may cause some false positives. But, the initial functions may be able to provide greater functionality has only available at the earlier time. When exit is not determined at a higher threshold, the data obtained previously can be used. Thus, there can be one or more intermediate thresholds that cause some preparatory or background functionality to be performed.

VI. Exit Detection

Figure 6:
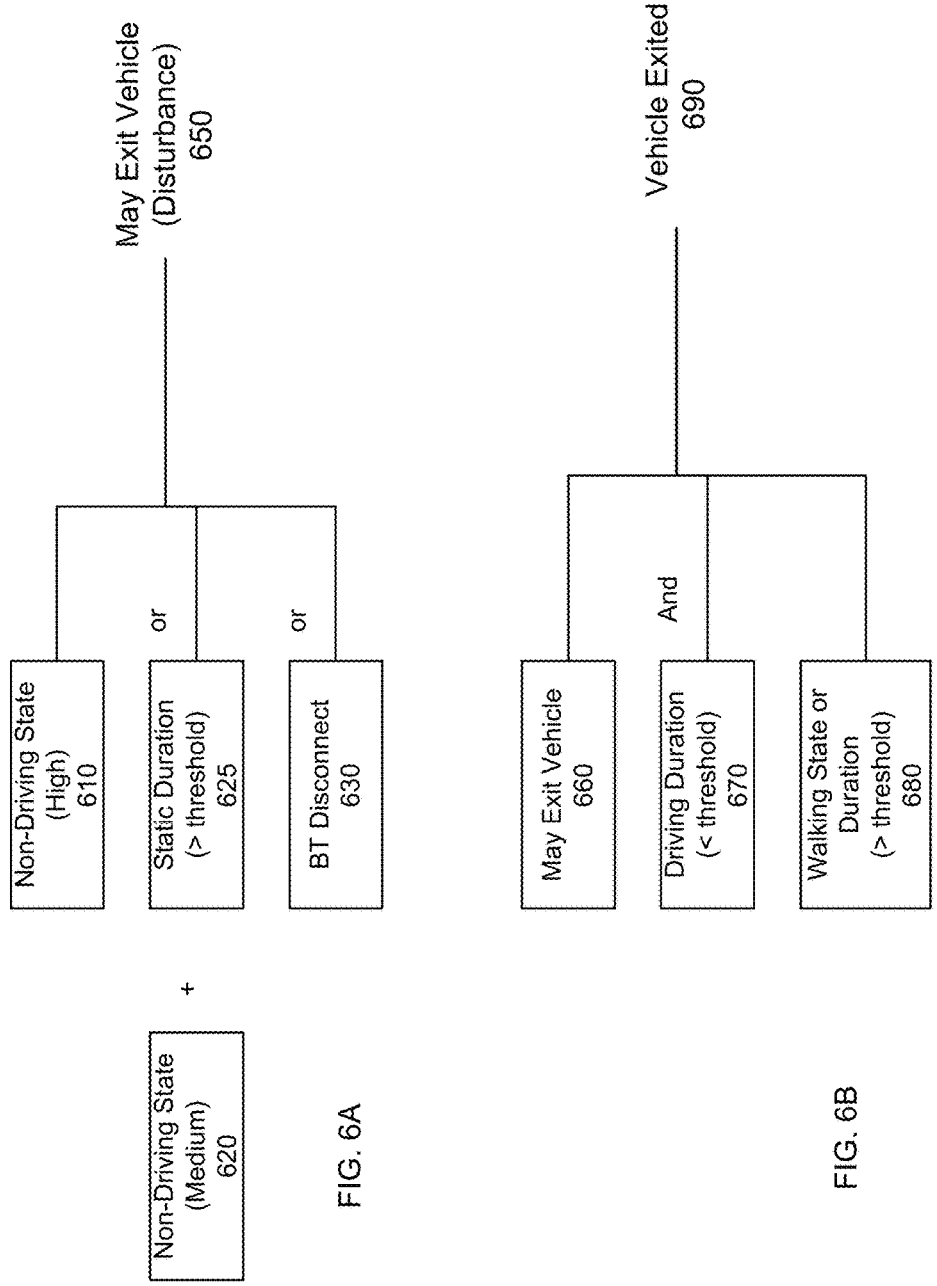
FIG. 6A shows a diagram for possible algorithms for detecting a disturbance according to embodiments of the present invention.
FIG. 6B shows a diagram for possible algorithms for determining an exit from a vehicle according to embodiments of the present invention.

FIG. 6A shows a diagram for possible algorithms for detecting a disturbance according to embodiments of the present invention. FIG. 6B shows a diagram for possible algorithms for determining an exit from a vehicle according to embodiments of the present invention.

In FIG. 6A, there are three different scenarios for when a disturbance is detected. The first scenario 610 occurs when a non-driving state has a high likelihood. The second scenario corresponds to criteria 620 and 625. The second scenario occurs when the non-driving state 620 is determined to occur with medium likelihood and mobile device as the classified as being static longer than a specified duration threshold (625). The third scenario 630 occurs when a Bluetooth (BT) disconnect, or other disconnect of a wireless connection to the vehicle computer, is detected. Any of the three scenarios result can in the determination of the user may exit the vehicle, and thus can correspond to disturbance 650.

In some embodiments, if a non-driving state has a sufficiently high probability, it may cause a disturbance, and at the same time or after an increase, then the probability can be high enough to identify an exit without any other criteria being satisfied. In other embodiments, additional criteria may be used.

In FIG. 6B, three criteria are shown as being required to determine that the user has exited the vehicle. One criterion is that a determination is made that the user may exit the vehicle (660). Such a determination can be made according to FIG. 6A. A second criterion is that the driving duration is less than a threshold value (670). A third criterion is that the walking duration is greater than a threshold value (680). For example, a history of user's activity states going back a fixed duration of time (e.g., driving, walking, etc.). The total amount of driving and static durations in this buffer can be computed. Thus, a criterion would be to have only a small amount of driving (or no driving) in this history buffer to be confident that the user has exited the vehicle 690. In a manner, this can test how long ago a driving state occurred.

If probabilities are determined for a driving state, then the probabilities can be summed for the states saved in the buffer.

Other criteria can be the locking state is determined with the likelihood greater threshold or that a walking state has been determined for greater than a threshold duration. Many state criteria are satisfied, it can be determined that the user has exited the vehicle. As a separate test, one embodiment can determine a vehicle exit when sufficient time has elapsed since the connection to the vehicle computer without any driving detections.

VII. Functionality

Figure 7:
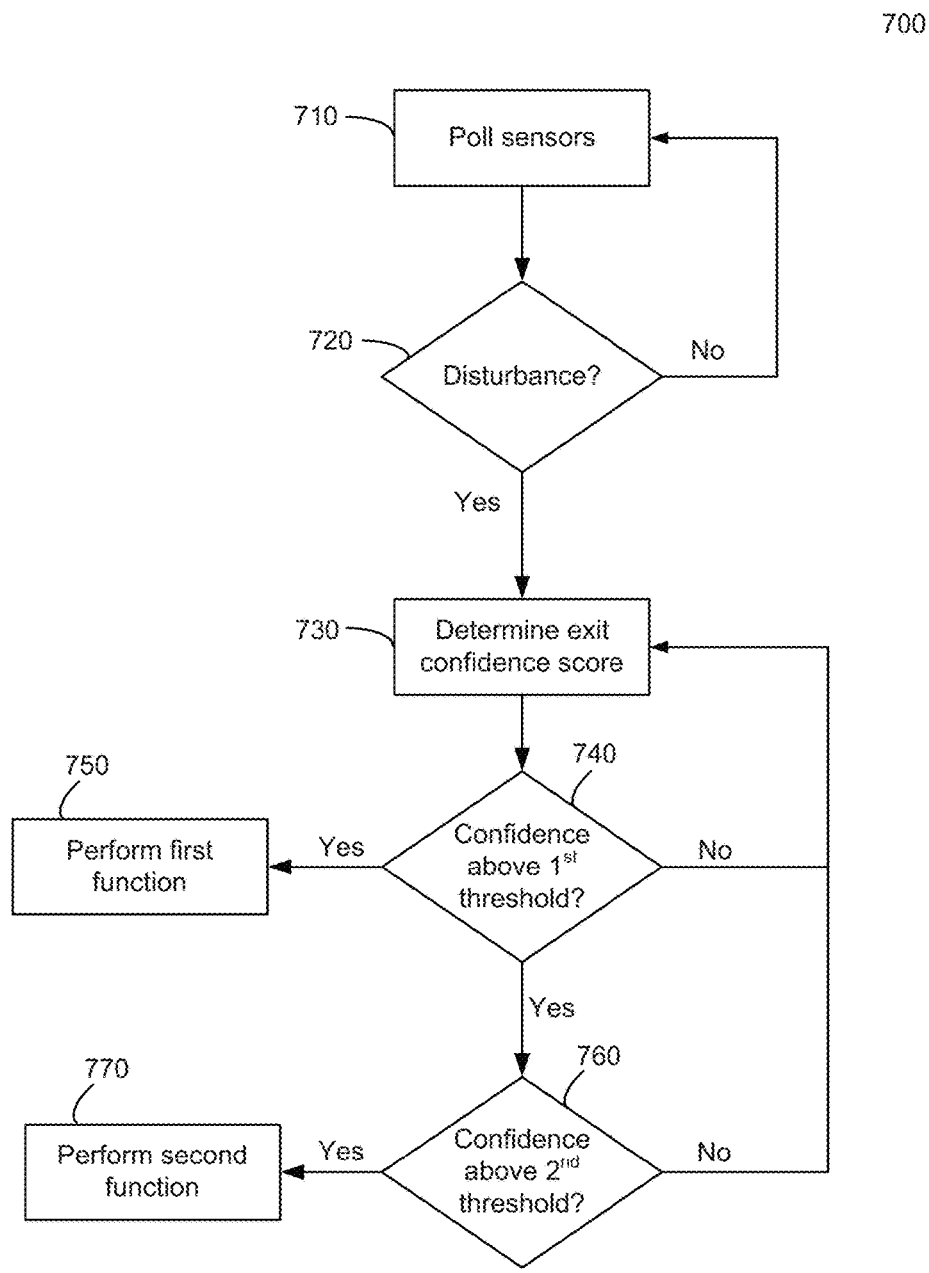
FIG. 7 is a flowchart of method 700 for tracking and exit confidence score and performing corresponding functionality according to embodiments of the present invention.

FIG. 7 is a flowchart of method 700 for tracking and exit confidence score and performing corresponding functionality according to embodiments of the present invention. Method 700 can be performed to determine whether or not the user has exited the vehicle, the search functionality being performed before, at, or after the exit of the vehicle.

At block 710, the sensors are polled for new data. For example, the sensor data can be obtained every t seconds as part of a measurement for current epoch. Sensor data can be stored in a buffer, where the sensor data for the last N epochs can be stored.

At block 720, it is determined whether disturbance has occurred the current epoch. If a disturbance has occurred, then it can be determined to monitor for an exit by the user. The exit of the user can be monitored by determining an exit confidence score. If the disturbance is not occurred, the method can return back to block 710 to obtain the sensor data for the next epoch.

At block 730, the exit confidence score is determined. The exit confidence score can be continuously computed at specified time intervals, which can be the same time intervals as the epochs used to determine whether disturbance has occurred. The determination of exit confidence score can be computed based on tracking accumulated static and driving durations, and other criteria described herein.

At block 740, the exit confidence score is compared to a first threshold. If the exit confidence score is not above the first threshold, method 700 can return back to block 732 determined the score for the next time step. If the first threshold is exceeded, method 700 can proceed to perform a first function at block 750. The first function can perform preparatory actions and/or obtain preparatory data for later functions. Block 750 may only be performed when the exit confidence score crosses the first threshold. If the exit confidence score decreases back below the first threshold and increases again to cross the first threshold, block 750 can be performed again.

At block 760, the exit confidence score is compared to a second threshold. If the second threshold is exceeded, the method 700 can proceed to perform the second function at block 770. The second function can use data obtained by the first function. For example the first function can obtain a location that the first time step with the first threshold is crossed, the second function can use of the location to identify where the vehicle is parked. The second threshold here can be used to ensure greater accuracy of determining an exit, also providing a greater accuracy obtaining the location.

Figure 8:
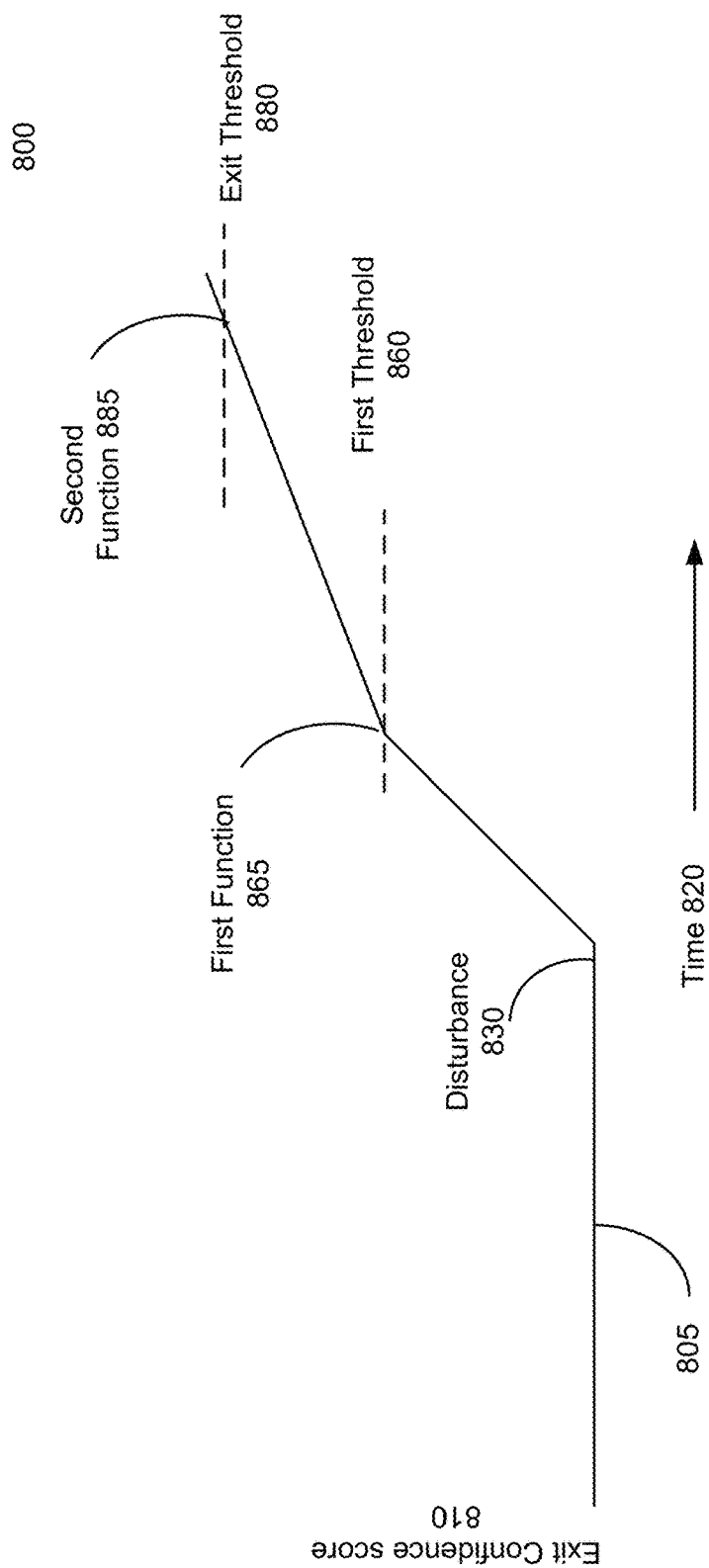
FIG. 8 is a diagram 800 illustrating the change in exit confidence score over time at different functions that can be performed at various thresholds according to embodiments of the present invention.

FIG. 8 is a diagram 800 illustrating the change in exit confidence score over time at different functions that can be performed at various thresholds according to embodiments of the present invention. The horizontal axis corresponds to the time 820. The vertical axis corresponds to the exit confidence score 810. Plot 805 shows the change of the exit confidence score over time.

Plot 805 starts out at a zero value, which can correspond to when the user is driving. A disturbance 830 is detected. At this point, a confidence score algorithm can be initiated to begin determining the exit confidence score. In one aspect, the score can be determined at periodic intervals starting from when disturbance 830 occurs.

After disturbance 830, plot 805 increases. The increase may be the result of a determination of the walking state, which may be determined by a motion classifier. The increase can be due to many factors, such as the continuance of the condition(s) that cause disturbance 830 to be detected, and other factors described herein.

As shown, plot 805 reaches first threshold 860 and a first function 865 is performed. In one embodiment, the first function obtains data (e.g., a location) of the mobile device, and can temporarily save the data in memory in case it is needed in the future. In another embodiment, first function 865 can simply start up circuitry to obtain data. For example, GPS circuitry can take a little time to become operational, and the first function can power on the GPS circuitry. As stated above, the first function could also use the GPS circuitry to obtain a location.

Plot 805 reaches the exit threshold 880, and a second function 885 can be performed. The determination of an exit can be made of the exit threshold 880 is reached. Second function 885 can use the data obtained by first function 865. For example, the second function 885 can associate the location obtained by first function 865 with a parked location with an application that identifies where the vehicle is parked.

In the parked vehicle example, since first function 865 is performed first, first function 865 can obtain a more accurate location for the parked car. This is because the user is likely exited the car at some point earlier than when exit threshold 880 is crossed. Thus, second function 885 can effectively go back in time to obtain the location of the mobile device at the earlier time, and use the location for the parked car app. In one implementation, a find-my-car application can start a positioning engine (say, GPS) as part of first function 865. GPS may take some time to compute a fix (location). When exit threshold 880 is reached, second function 885 can back to locations obtained after 865, and possibly project backward in time to obtain the true position.

In some embodiments, additional thresholds can exist after exit threshold 880. For example, an application that wants to change functionality (e.g., a user interface) when an exit is determined may want to impose additional checks past the exit detection. For instance, the application may want to do something when the user exits the car and walks away a specified distance (e.g., 100 m), but not if the user exits the vehicle and stays in the neighborhood of the vehicle (e.g., to pump gas). In such an application, knowing when 865 happened can allow the application to compute the user's distance from the true exit, instead of from 880 which may be much farther from the exit point. Embodiments could also just use exit threshold 880 as the location of exit, and then determine a distance from that location, and thus first threshold 860 would not be used.

VIII. Mobile Device

Figure 9:
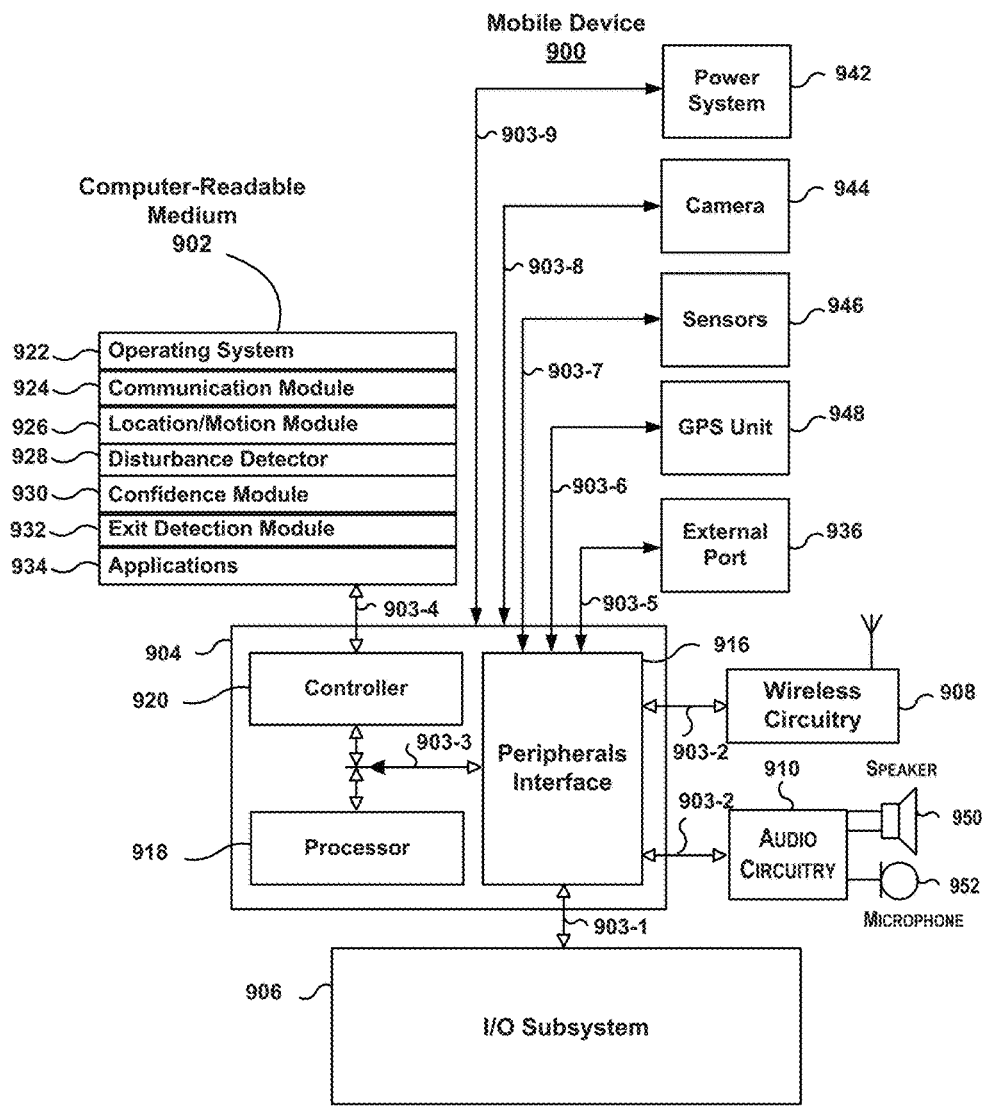
FIG. 9 is a block diagram of a portable electronic device or mobile device 900 according to an embodiment of the invention.

FIG. 9 is a block diagram of a portable electronic device or mobile device 900 according to an embodiment of the invention. Mobile device 900 generally includes computer-readable medium 902, a processing system 904, an Input/Output (I/O) subsystem 906, wireless circuitry 908, and audio circuitry 910 including speaker 950 and microphone 952. These components may be coupled by one or more communication buses or signal lines 903. Device 900 can be any portable electronic device, including a handheld computer, a tablet computer, a mobile phone, laptop computer, tablet device, media player, personal digital assistant (PDA), a key fob, a car key, an access card, a multi-function device, a mobile phone, a portable gaming device, or the like, including a combination of two or more of these items.

It should be apparent that the architecture shown in FIG. 9 is only one example of an architecture for mobile device 900, and that device 900 can have more or fewer components than shown, or a different configuration of components. The various components shown in FIG. 9 can be implemented in hardware, software, or a combination of both hardware and software, including one or more signal processing and/or application specific integrated circuits.

Wireless circuitry 908 is used to send and receive information over a wireless link or network to one or more other devices' conventional circuitry such as an antenna system, an RF transceiver, one or more amplifiers, a tuner, one or more oscillators, a digital signal processor, a CODEC chipset, memory, etc. In some embodiments, wireless circuitry 908 is capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced, WiFi (such as IEEE 802.11a, IEEE 802.11b, IEEE 802.11g and/or IEEE 802.11n), Bluetooth, Wi-MAX, voice over Internet Protocol (VoIP), near field communication protocol (NFC), a protocol for email, instant messaging, and/or a short message service (SMS), or any other suitable communication protocol, including communication protocols not yet developed as of the filing date of this document. A mobile device can include wireless circuitry that can communicate over several different types of wireless networks depending on the range required for the communication. For example, a short-range wireless transceiver (e.g., Bluetooth), a medium-range wireless transceiver (e.g., WiFi), and/or a long range wireless transceiver (e.g., GSM/GPRS, UMTS, CDMA2000 1x/EV-DO and LTE/LTE-Advanced) can be used depending on the type of communication or the range of the communication.

Wireless circuitry 908 is coupled to processing system 904 via peripherals interface 916. Interface 916 can include conventional components for establishing and maintaining communication between peripherals and processing system 904. Voice and data information received by wireless circuitry 908 (e.g., in speech recognition or voice command applications) is sent to one or more processors 918 via peripherals interface 916. One or more processors 918 are configurable to process various data formats for one or more application programs 934 stored on medium 902.

Peripherals interface 916 couple the input and output peripherals of the device to processor 918 and computer-readable medium 902. One or more processors 918 communicate with computer-readable medium 902 via a controller 920. Computer-readable medium 902 can be any device or medium that can store code and/or data for use by one or more processors 918. Medium 902 can include a memory hierarchy, including cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). In some embodiments, peripherals interface 916, one or more processors 918, and memory controller 920 can be implemented on a single chip, such as processing system 904. In some other embodiments, they can be implemented on separate chips.

Mobile device 900 also includes a power system 942 for powering the various hardware components. Power system 942 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, mobile device 900 includes a camera 944. In some embodiments, mobile device 900 includes sensors 946. Sensors can include accelerometers, compass, gyrometer, pressure sensors, audio sensors, light sensors, barometers, and the like. Sensors 946 can be used to sense location aspects, such as auditory or light signatures of a location.

In some embodiments, mobile device 900 can include a GPS receiver, sometimes referred to as a GPS unit 948. A mobile device can use a satellite navigation system, such as the Global Positioning System (GPS), to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 918 run various software components stored in medium 902 to perform various functions for device 900. In some embodiments, the software components include an operating system 922, a communication module (or set of instructions) 924, a location module (or set of instructions) 926, a disturbance detector (or set of instructions) 928, a confidence module (or set of instructions) 930, an exit detection module (or set of instructions) 932, and other applications (or set of instructions) 934, such as a car locator app and a navigation app.

Operating system 922 can be any suitable operating system, including iOS, Mac OS, Darwin, RTXC, LINUX, UNIX, OS X, WINDOWS, or an embedded operating system such as VxWorks. The operating system can include various procedures, sets of instructions, software components and/or drivers for controlling and managing general system tasks (e.g., memory management, storage device control, power management, etc.) and facilitates communication between various hardware and software components.

Communication module 924 facilitates communication with other devices over one or more external ports 936 or via wireless circuitry 908 and includes various software components for handling data received from wireless circuitry 908 and/or external port 936. External port 936 (e.g., USB, FireWire, Lightning connector, 30-pin connector, etc.) is adapted for coupling directly to other devices or indirectly over a network (e.g., the Internet, wireless LAN, etc.).

Location/motion module 926 can assist in determining the current position (e.g., coordinates or other geographic location identifier) and motion of mobile device 900. Modern positioning systems include satellite based positioning systems, such as Global Positioning System (GPS), cellular network positioning based on "cell IDs," and WiFi positioning technology based on a WiFi networks. Typically, GPS is the most accurate, but often consumes more power than the other positioning systems. GPS also relies on the visibility of multiple satellites to determine a position estimate, which may not be visible (or have weak signals) indoors or in "urban canyons." In some embodiments, location/motion module 926 receives data from GPS unit 948 and analyzes the signals to determine the current position of the mobile device. In some embodiments, location/motion module 926 can determine a current location using WiFi or cellular location technology. For example, the location of the mobile device can be estimated using knowledge of nearby cell sites and/or WiFi access points with knowledge also of their locations. Information identifying the WiFi or cellular transmitter is received at wireless circuitry 908 and is passed to location/motion module 926. In some embodiments, the location module receives the one or more transmitter IDs. In some embodiments, a sequence of transmitter IDs can be compared with a reference database (e.g., Cell ID database, WiFi reference database) that maps or correlates the transmitter IDs to position coordinates of corresponding transmitters, and computes estimated position coordinates for mobile device 900 based at least in part on the position coordinates of the corresponding transmitters. Regardless of the specific location technology used, location/motion module 926 receives information from which a location fix can be derived, interprets that information, and returns location information, such as geographic coordinates, latitude/longitude, or other location fix data.

Disturbance detector (or set of instructions) 928 can detect a disturbance, as described herein. For example, disturbance detector 928 may use measurements from sensors 946 and/or output of location/motion module (e.g., functioning as a motion classifier) to identify a disturbance.

Confidence module (or set of instructions) 930 can take various inputs from mobile device sensors, as well as an output of location/motion module, and determine a confidence score as to whether the user has exited a vehicle. For example, sensors can include an accelerometer and a compass in some embodiments. Based on acceleration and direction values from the accelerometer and the compass, the confidence module (potentially in conjunction with location/motion module 926) may determine the confidence score.

Exit detection module (or set of instructions) 932 may be an application running on the mobile device to determine whether the user has exited a vehicle based on the confidence score from confidence module 930.

The one or more applications 934 on the mobile device can include any applications installed on the device 900, including without limitation, a browser, address book, contact list, email, instant messaging, word processing, keyboard emulation, widgets, JAVA-enabled applications, encryption, digital rights management, voice recognition, voice replication, a music player (which plays back recorded music stored in one or more files, such as MP3 or AAC files), etc. The one or more applications 934 can also include a specific app for finding a parked car, a maps application, or any other suitable application.

There may be other modules or sets of instructions (not shown), such as a graphics module, a time module, etc. For example, the graphics module can include various conventional software components for rendering, animating and displaying graphical objects (including without limitation text, web pages, icons, digital images, animations and the like) on a display surface. In another example, a timer module can be a software timer. The timer module can also be implemented in hardware. The time module can maintain various timers for any number of events.

The I/O subsystem 906 can be coupled to a display system (not shown), which can be a touch-sensitive display. The display displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 906 can include a display and user input devices such as a keyboard, mouse, and/or trackpad. In some embodiments, I/O subsystem 906 can include a touch-sensitive display. A touch-sensitive display can also accept input from the user based on haptic and/or tactile contact. In some embodiments, a touch-sensitive display forms a touch-sensitive surface that accepts user input. The touch-sensitive display/surface (along with any associated modules and/or sets of instructions in medium 902) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, the I/O subsystem can be coupled to one or more other physical control devices (not shown), such as pushbuttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 900 can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch-sensitive display or an extension of the touch-sensitive surface formed by the touch-sensitive display.

Advantages to certain embodiments of the invention include automatically marking a parking location when it is determined that a car is in a parked state. This can be done without prompting by the user and therefore the user does not have to remember to manually mark a parking location. This improves the user experience and is more convenient for the user.

Further advantages to certain embodiments of the invention include enabling parking location marking in weak location signal scenarios. Some embodiments of the invention permit marking a car's parking location without using transponders in parking areas (e.g., transponder near parking spots) to transmit a unique identifier which can be used to locate a parking spot.

In some embodiments, some or all of the operations described herein can be performed using an application executing on the user's mobile device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Computer programs incorporating various features of the present invention may be encoded on various computer readable storage media; suitable media include magnetic disk or tape, optical storage media such as compact disk (CD) or DVD (digital versatile disk), flash memory, and the like. Computer readable storage media encoded with the program code may be packaged with a compatible device or provided separately from other devices. In addition program code may be encoded and transmitted via wired optical, and/or wireless networks conforming to a variety of protocols, including the Internet, thereby allowing distribution, e.g., via Internet download.

Although the invention has been described with respect to specific embodiments, it will be appreciated that the invention is intended to cover all modifications and equivalents within the scope of the following claims.

What is claimed is:

1. A method for detecting a change in a motion state of a user of a mobile device, the method comprising:
   determining, based on one or more sensors of the mobile device, that the motion state of the user is a driving state, the driving state indicating that the user is inside a vehicle that is moving;
   monitoring, with the mobile device, the one or more sensors;
   determining, by the mobile device, that a new motion state is a non-driving state, wherein determining the new motion state as the non-driving state is based on measurements from the one or more sensors, wherein the determining that the new motion state is a non-driving state comprises determining a confidence score of whether the user has exited the vehicle, the determination being made by the mobile device at a plurality of times, wherein the confidence score is determined based on measurements from the one or more sensors at the plurality of times;
   in response to the new motion state being the non-driving state, identifying a location where the user exited the vehicle using one or more of the measurements from the one or more sensors before the determining that the new motion state is the non-driving state;
   identifying the location where the user exited the vehicle as corresponding to a parked location of the vehicle; and
   storing the parked location of the vehicle for retrieval by an application that identifies the parked location.

2. The method according to claim 1, wherein determining, by the mobile device, that the new motion state is the non-driving state comprises:
   prior to determining the confidence score, detecting, with the mobile device, a disturbance based on measurements from the one or more sensors, the disturbance indicating a possibility that the user exited the vehicle;
   comparing, with the mobile device, the confidence score to a first threshold; and
   in response to the confidence score exceeding the first threshold at a first time, obtaining a location of the mobile device at the first time.

3. The method according to claim 2, further comprising:
   after determining the confidence score exceeds the first threshold at a first time comparing, with the mobile device, the confidence score to a second threshold at a second time; and
   in response to the confidence score exceeding the second threshold at the second time, identifying that the vehicle is parked and identifying a location where the vehicle is parked based on the location of the mobile device obtained at the first time.

4. The method according to claim 3, wherein in response to identifying that the vehicle is parked, automatically marking the location where the vehicle is parked as a parking location.

5. The method according to claim 2, wherein the location at the first time is obtained using GPS circuitry.

6. The method according to claim 1, further comprising:
   determining a confidence score of whether the new motion state is a non-driving state, wherein the confidence score is determined based on the measurements from the one or more sensors at a plurality of times;
   comparing, with the mobile device, the confidence score to a first threshold; and
   in response to the confidence score exceeding the first threshold at a first time, storing one or more measurements from the one or more sensors at the first time.

7. The method according to claim 6, wherein the determining that the new motion state is the non-driving state occurs in response to the confidence score being greater than a second threshold, wherein the second threshold is greater than the first threshold.

8. The method according to claim 7, wherein in response to the confidence score being greater than the second threshold, using the stored one or more measurements to identify the location where the user exited the vehicle.

9. A computer product comprising a non-transitory computer readable medium storing a plurality of instructions that when executed control a computer system to detect a change in a motion state of a user of a mobile device, the instructions comprising:
   instructions for determining, based on one or more sensors of the mobile device, that the motion state of the user is a driving state, the driving state indicating that the user is inside a vehicle that is moving;
   instructions for monitoring, with the mobile device, the one or more sensors;
   instructions for, by the mobile device, that a new motion state is a non-driving state, wherein determining the new motion state as the non-driving state is based on measurements from the one or more sensors, wherein the determining that the new motion state is a non-driving state comprises determining a confidence score of whether the user has exited the vehicle, the determination being made by the mobile device at a plurality of times, wherein the confidence score is determined based on measurements from the one or more sensors at the plurality of times;
   in response to the new motion state being the non-driving state, instructions for identifying a location where the user exited the vehicle using one or more of the measurements from the one or more sensors before the determining that the new motion state is the non-driving state;

instructions for identifying the location where the user exited the vehicle as corresponding to a parked location of the vehicle; and instructions for storing the parked location of the vehicle for retrieval by an application that identifies the parked location.

10. The computer product according to claim 9, wherein the instructions for determining, by the mobile device, that the new motion state is the non-driving state comprises:

instructions for detecting prior to determining the confidence score, with the mobile device, a disturbance based on measurements from the one or more sensors, the disturbance indicating a possibility that the user exited the vehicle;

instructions for comparing, with the mobile device, the confidence score to a first threshold; and in response to the confidence score exceeding the first threshold at a first time, instructions for obtaining a location of the mobile device at the first time.

11. The computer product according to claim 10, further comprising:

after determining the confidence score exceeds the first threshold at a first time instructions for comparing, with the mobile device, the confidence score to a second threshold at a second time; and in response to the confidence score exceeding the second threshold at the second time, instructions for identifying that the vehicle is parked and identifying a location where the vehicle is parked based on the location of the mobile device obtained at the first time.

12. The computer product according to claim 11, further comprising: in response to identifying that the vehicle is parked, instructions for automatically marking the location where the vehicle is parked as a parking location.

13. The computer product according to claim 9, further comprising:

instructions for determining a confidence score of whether the new motion state is a non-driving state, wherein the confidence score is determined based on the measurements from the one or more sensors at a plurality of times;

instructions for comparing, with the mobile device, the confidence score to a first threshold; and in response to the confidence score exceeding the first threshold at a first time, instructions for storing one or more measurements from the one or more sensors at the first time.

14. The computer product according to claim 13, wherein the determining that the new motion state is the non-driving state occurs in response to the confidence score being greater than a second threshold, wherein the second threshold is greater than the first threshold.

15. The computer product according to claim 14, further comprising: in response to the confidence score being greater than the second threshold, instructions for using the stored one or more measurements to identify the location where the user exited the vehicle.

16. A mobile device comprising:

one or more sensors;

a display; and one or more processors configured to perform operations for detecting a change in a motion state of a user of the mobile device, the operations comprising:

determining, based on one or more sensors of the mobile device, that the motion state of the user is a driving state, the driving state indicating that the user is inside a vehicle that is moving;

monitoring, with the mobile device, the one or more sensors;

determining, by the mobile device, that a new motion state is a non-driving state, wherein determining the new motion state as the non-driving state is based on measurements from the one or more sensors, wherein the determining that the motion state is a non-driving state comprises determining a confidence score of whether the user has exited the vehicle, the determination being made by the mobile device at a plurality of times, wherein the confidence score is determined based on measurements from the one or more sensors at the plurality of times;

in response to the new motion state being the non-driving state, identifying a location where the user exited the vehicle using one or more of the measurements from the one or more sensors before the determining that the new motion state is the non-driving state;

identifying the location where the user exited the vehicle as corresponding to a parked location of the vehicle; and storing the parked location of the vehicle for retrieval by an application that identifies the parked location.

17. The mobile device according to claim 16, wherein determining, by the mobile device, that the new motion state is the non-driving state comprises:

prior to determining the confidence score, detecting, with the mobile device, a disturbance based on measurements from the one or more sensors, the disturbance indicating a possibility that the user exited the vehicle;

comparing, with the mobile device, the confidence score to a first threshold; and in response to the confidence score exceeding the first threshold at a first time, obtaining a location of the mobile device at the first time.

* * * * *